United States Patent
Byeon et al.

(10) Patent No.: US 9,460,826 B2
(45) Date of Patent: Oct. 4, 2016

(54) CONDUCTIVE COMPOSITION FOR FORMING A GROUND ELECTRODE OF A LIQUID CRYSTAL DISPLAY, AND A METHOD OF FORMING A GROUND ELECTRODE USING THE SAME

(71) Applicant: Dongjin Semichem Co., Ltd., Incheon (KR)

(72) Inventors: Ja Hun Byeon, Gyeonggi-Do (KR); Dong Min Kim, Gyeonggi-Do (KR); Won-Young Lee, Gyeonggi-Do (KR); Eun Jeagal, Gyeonggi-Do (KR); Seung-Ki Kim, Gyeonggi-Do (KR); Woo Sung Hong, Gyeonggi-Do (KR); Jung Yul Lee, Gyeonggi-Do (KR); You-Young Kim, Gyeonggi-Do (KR)

(73) Assignee: Dongjin Semichem Co., Ltd., Incheon (KR)

( * ) Notice: Subject to any disclaimer, the term of this patent is extended or adjusted under 35 U.S.C. 154(b) by 58 days.

(21) Appl. No.: 14/361,512

(22) PCT Filed: Dec. 3, 2012

(86) PCT No.: PCT/KR2012/010390
§ 371 (c)(1),
(2) Date: May 29, 2014

(87) PCT Pub. No.: WO2013/100421
PCT Pub. Date: Jul. 4, 2013

(65) Prior Publication Data
US 2014/0326927 A1    Nov. 6, 2014

(30) Foreign Application Priority Data
Dec. 29, 2011   (KR) .................. 10-2011-0146217

(51) Int. Cl.
*H01B 1/00* (2006.01)
*B05D 5/12* (2006.01)
*H01B 1/12* (2006.01)
*H01B 1/22* (2006.01)
*G02F 1/1343* (2006.01)
*C09D 165/00* (2006.01)

(52) U.S. Cl.
CPC ................ *H01B 1/127* (2013.01); *B05D 5/12* (2013.01); *C09D 165/00* (2013.01); *G02F 1/13439* (2013.01); *H01B 1/22* (2013.01); *C08G 2261/1424* (2013.01); *C08G 2261/3223* (2013.01); *C08G 2261/794* (2013.01)

(58) Field of Classification Search
CPC ........ H01B 1/00; H01B 1/124; H01B 1/127; B05D 5/12
See application file for complete search history.

(56) References Cited

U.S. PATENT DOCUMENTS

2008/0293855 A1* 11/2008 Kim ..................... C08L 65/00
                                                        524/114

FOREIGN PATENT DOCUMENTS

| CN | 1255513 | | 6/2000 | |
|---|---|---|---|---|
| CN | 1658052 | A | 8/2005 | |
| CN | 101665616 | * | 3/2010 | .......... Y02E 10/549 |
| CN | 101750792 | A | 6/2010 | |
| CN | 101880460 | A | 11/2010 | |
| KR | 1020050040533 | | 5/2005 | |
| KR | 201000047440 | | 5/2010 | |
| KR | 201000066752 | | 6/2010 | |

OTHER PUBLICATIONS

International Search Report dated Mar. 15, 2013 related to PCT/KR2012/010390.
Office Action issued in co-pending Chinese application No. 201280064985.3, issued Nov. 13, 2015.

* cited by examiner

*Primary Examiner* — Mark Kopec
(74) *Attorney, Agent, or Firm* — Dinsmore & Shohl LLP; Weston R. Gould

(57) ABSTRACT

The present invention relates to a conductive composition for forming a back electrode of a liquid crystal device, and a formation method of a back electrode using the same. The conductive composition enables the supply of a back electrode having excellent coating uniformity, low surface resistance, high transmittance and surface hardness, and particularly excellent reliability of 500 hours.

14 Claims, No Drawings

CONDUCTIVE COMPOSITION FOR FORMING A GROUND ELECTRODE OF A LIQUID CRYSTAL DISPLAY, AND A METHOD OF FORMING A GROUND ELECTRODE USING THE SAME

CROSS-REFERENCE TO RELATED APPLICATIONS

This application is the U.S. National Phase of PCT/KR2012/010390 filed Dec. 3, 2012, which claims priority of Korean Patent Application No. 10-2011-0146217 filed Dec. 29, 2011.

TECHNICAL FIELD

The present invention relates to a conductive composition for forming a ground electrode of a liquid crystal display (LCD), and a method of forming a ground electrode using the same.

BACKGROUND OF ART

The ground electrode of a LCD plays a role of blocking the static electricity inflow from outside, and ITO (Indium-Tin-Oxide) or IZO (Indium-Zinc-Oxide) has been used as a ground electrode material formerly.

The ITO or IZO has an advantage of excellent electric resistance and surface hardness, but they have a disadvantage that a particular process such as a vacuum deposit process and the like is required for forming a ground electrode by using the same and the light transparency of the formed electrode is poor.

And recently, as the problem of the exhaustion of indium resources has been on the rise, the development of various transparent electrode materials for replacing ITO and the like is being issued.

However, many transparent electrode materials hitherto known (for example, conductive polymers or inorganic conductive compositions including a metal or a metal oxide and the like) have shown unsatisfactory results.

Particularly, in case of a conductive polymer, the light transparency is relatively good but there is a problem that the surface resistance increases according to the use time for the ground electrode.

DETAILED DESCRIPTION OF THE INVENTION

Technical Problem

It is an aspect of the present invention to provide a conductive composition for forming a ground electrode of a liquid crystal display (LCD) which is superior in the coating uniformity, and can provide a ground electrode having low surface resistance and high light transparency and surface hardness.

It is another aspect of the present invention to provide a method of forming a ground electrode for a LCD using said composition.

Technical Solution

According to the present invention, a conductive composition for forming a ground electrode of a LCD, including a conductive polymer; a dopant; a solvent having a carbonyl group in the molecule; and a silane coupling agent is provided.

Here, the conductive composition may include 0.1 to 10 weight % of the conductive polymer; 0.1 to 10 weight % of the dopant; 60 to 95 weight % of the solvent having a carbonyl group in the molecule; and 0.1 to 20 weight % of the silane coupling agent.

And, the solvent may be dimethylformamide, acethylacetone, or a mixture thereof.

Furthermore, the composition may further include one or more solvents selected from the group consisting of methyl alcohol, ethyl alcohol, isopropanol, ethylene glycol, butanediol, neopentyl glycol, 1,3-pentanediol, 1,4-cyclohexane dimethanol, diethylene glycol, polyethylene glycol, polybutylene glycol, dimethylol propane, trimethylol propane, propylene glycol monomethyl ether, chloroform, dichloromethane, tetrachloroethylene, trichloroethylene, dibromoethane, dibromopropane, n-methylpyrrolidone, dimethyl sulfoxide, triethylamine, tributylamine, trioctylamine, cresol, and water, as a co-solvent.

At this time, the co-solvent may be included with a weight ratio of 1:10 to 1:20 on the basis of the weight of the solvent having a carbonyl group in the molecule.

The conductive polymer may be one or more compounds selected from the group consisting of polyaniline-based polymer, polypyrrole-based polymer, and polythiophene-based polymer.

The dopant may be one or more compounds selected from the group consisting of dodecylbenzenesulfonic acid, toluenesulfonic acid, camphorsulfonic acid, benzenesulfonic acid, hydrochloric acid, styrenesulfonic acid, 2-acrylamido-2-methylpropanesulfonic acid, 2-sulfosuccinate, 5-sodiumsulfoisophthalic acid, dimethyl-5-sodiumsulfoisophthalate, and 5-sodiumsulfo-bis(β-hydroxyethylisophthalate).

Furthermore, the silane coupling agent may be one or more compounds selected from the group consisting of alkyloxysilane-based compound, aminosilane-based compound, vinylsilane-based compound, epoxysilane-based compound, methacryloxysilane-based compound, isocyanatesilane-based compound, and fluorinesilane-based compound.

In addition to, according to the present invention, a method of forming a ground electrode for a LCD including a step of coating the conductive composition on a substrate is provided.

Advantageous Effects

The conductive composition for forming a ground electrode of a LCD according to the present invention is superior in the coating uniformity, and the ground electrode formed by using the same has low surface resistance and high light transparency and surface hardness and is particularly superior in '500 hours reliability', and thus it makes it possible to provide a ground electrode for a LCD (particularly, an in-plane switching (IPS) mode LCD, a fringe field switching (FFS) mode LCD, and the like) having more improved properties.

DETAILED DESCRIPTION OF THE EMBODIMENTS

Hereinafter, the conductive composition for forming a ground electrode of a LCD and the method of forming a ground electrode using the same are explained according to the concrete embodiments of the present invention.

First of all, in the whole of the present specification, the term 'include' or 'comprise' means including any component (or constituent, or step) without any limitation unless there is overt mention about them, and it should not be understood as excluding or eliminating an addition of other components.

In the process of studying a LCD, the present inventors recognized that, when the conductive composition for forming a ground electrode includes a solvent satisfying a certain property in company with a conductive polymer, a dopant, and a silane coupling agent, the diffusion of the conductive polymer and the dopant in the composition can be facilitated according to the heat of reaction generated during the preparation of the composition, and the acidity range of the composition. And, from this, the present inventors recognized that, since not only the coating uniformity of the composition is superior but also the ground electrode formed by using the same has low surface resistance, high light transparency and surface hardness, it is possible to provide a ground electrode for a LCD having superior properties, and accomplished the present invention.

According to one embodiment of the present invention, a conductive composition for forming a ground electrode of a LCD, including a conductive polymer; a dopant; a solvent having a carbonyl group in the molecule; and a silane coupling agent is provided.

Namely, the conductive composition according to the present invention is a composition that the conductive composition, the dopant, and the silane coupling agent are dispersed in a dispersion medium including the solvent, and since the composition includes the solvent having a carbonyl group in the molecule, the dispersity of the conductive polymer and the dopant in the composition can be optimized and the coating uniformity of the composition is good, and the ground electrode formed by using the same can maintain low surface resistance even under the condition of high temperature and high humidity and can show high light transparency and surface hardness.

Hereinafter, the components which may be included in the conductive composition according to the embodiment are explained.

At first, the conductive polymer is a basic component for giving conductivity to the composition, and any conductive polymer common in the technical field to which the present invention pertains may be used and it is not limited particularly.

However, according to the present invention, the conductive polymer may be one or more polymers selected from the group consisting of polyaniline-based polymer, polypyrrole-based polymer, and polythiophene-based polymer. Particularly, it may be preferable in the aspect of securing conductivity and dispersity that the conductive polymer is poly(3, 4-ethylene dioxythiophene) which is one of the polythiophene-based polymer.

And, the content of the conductive polymer may be 0.1 to 10 weight %, preferably 0.5 to 10 weight %, and more preferably 1 to 5 weight %, per the total weight of the composition. Namely, the content of the conductive polymer is preferably 0.1 weight % or more per the total weight of the composition in order to prevent the increase of the electric resistance while securing a minimum conductivity required to the composition. However, if the conductive polymer is excessively included in the composition, the light transparency, the dispersity, and the stability of the composition may deteriorate, and thus the content of the conductive polymer is preferably 10 weight % or less in order to prevent such deterioration.

Meanwhile, the conductive composition according to the embodiment may include a dopant. The dopant is a component for giving conductivity to the composition in company with said conductive polymer, and it is not limited particularly because any dopant common in the related art may be included in the composition.

However, according to the present invention, the dopant may be one or more compounds selected from the group consisting of dodecylbenzenesulfonic acid, toluenesulfonic acid, camphorsulfonic acid, benzenesulfonic acid, hydrochloric acid, styrenesulfonic acid, 2-acrylamido-2-methyl-propanesulfonic acid, 2-sulfosuccinate, 5-sodiumsulfoisophthalic acid, dimethyl-5-sodiumsulfoisophthalate, and 5-sodiumsulfo-bis(β-hydroxyethylisophthalate). Most of all, it is preferable for securing the conductivity and the dispersity that the dopant is poly(4-styrenesulfonate).

Particularly, it is more preferable in the aspect of the effects disclosed above to use a PEDOT-PPS by mixing poly(4-styrenesulfonate) (hereinafter TSS') as the dopant to poly(3,4-ethylene dioxythiophene) (hereinafter 'PEDOT') among the conductive polymers.

Namely, the conductivity of PEDOT itself is lower than ITO but it has the conductivity of about 500 s/cm, and shows better electric characteristics than ITO by forming a suitable interface with an organic active layer. However, the solubility of PEDOT is not enough and there is a problem of ambient stability, and thus it is preferable to use a form of PEDOT-PSS by adding PPS to PEDOT.

The PEDOT-PSS may be obtained by adding PPS as an anionic dopant to PEDOT. PEDOT and PSS are coupled by electrostatic attraction (see the following Chemical Formula 1), and PEDOT takes on positive (+) charge by PSS and it makes a band gap small so as to have metallic electron band structure. Here, the characteristics such as an electric conductivity, a work function, and the like may be changed according to the change of the PPS rate.

[Chemical Formula 1]

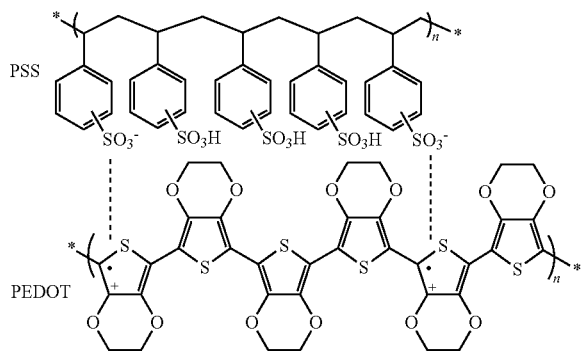

According to the present invention, the content of the dopant may be 0.1 to 10 weight %, preferably 0.5 to 10 weight %, and more preferably 1 to 5 weight %, per the total weight of the composition. Namely, in view of the electric resistance and dispersion property of the composition and the effect of adding said dopant, it is advantageous that the content of the dopant is controlled within the range disclose above.

In addition, the conductive composition according to the embodiment may include a solvent.

The solvent is a dispersion medium of the conductive composition according to the present invention, and particularly a solvent having a carbonyl group in the molecule is preferable. Namely, according to the present invention, when the solvent having a carbonyl group in the molecule is used as the dispersion medium of the composition, it influences on the acidity of the composition and promotes the diffusion of the conductive polymer and the dopant, and thus the dispersity can be optimized. According to this, the coating uniformity of the composition can be improved, and the surface electric conductivity of the ground electrode formed by using the same can be more improved because the surface resistance is low, and it is possible to show superior light transparency and surface hardness and high reliability even under the condition of high temperature and high humidity.

According to the present invention, it is preferable that the solvent is dimethylformamide, acethylacetone, or a mixture thereof, among the solvent having a carbonyl group in the molecule.

Furthermore, according to the present invention, it is more preferable that the solvent is a mixture of dimethylformamide and acethylacetone. Namely, when the mixture of dimethylformamide and acethylacetone is used as the solvent, the diffusion of the conductive polymer and the dopant is promoted more and the dispersity can be better than the case of using dimethylformamide or acethylacetone solely, and not only the hardness of the ground electrode formed from the composition but also the reliability of the ground electrode can be improved more.

Furthermore, the composition according to the present invention may further include a co-solvent in addition to the solvent having a carbonyl group in the molecule.

Here, the co-solvent may be one or more solvents selected from the group consisting of methyl alcohol, ethyl alcohol, isopropanol, ethylene glycol, butanediol, neopentyl glycol, 1,3-pentanediol, 1,4-cyclohexane dimethanol, diethylene glycol, polyethylene glycol, polybutylene glycol, dimethylol propane, trimethylol propane, propylene glycol monomethyl ether, chloroform, dichloromethane, tetrachloroethylene, trichloroethylene, dibromoethane, dibromopropane, n-methylpyrrolidone, dimethyl sulfoxide, triethylamine, tributylamine, trioctylamine, cresol, and water.

The co-solvent may be included with a weight ratio of 1:10 to 1:20, and preferably 1:15 to 1:20, on the basis of the weight of the solvent having a carbonyl group in the molecule, so as to exhibit the effect according to the addition of the solvent having a carbonyl group sufficiently.

More preferably, the conductive composition according to the present invention may include a solvent in which 100 parts by weight of isopropyl alcohol; 80 to 150 parts by weight of propylene glycol monomethyl ether; 5 to 30 parts by weight of dimethylformamide, acethylacetone, or a mixture thereof; and 50 to 120 parts by weight of water are mixed. Most preferably, the conductive composition according to the present invention may include a solvent in which 100 parts by weight of isopropyl alcohol; 90 to 110 parts by weight of propylene glycol monomethyl ether; 15 to 20 parts by weight of dimethylformamide, acethylacetone, or a mixture thereof; and 80 to 100 parts by weight of water are mixed.

And, the content of the solvent may be 60 to 95 weight %, preferably 70 to 95 weight %, and more preferably 80 to 95 weight %, per the total weight of the composition. Namely, the content of the solvent is preferably 60 weight % or more per the total weight of the composition in order to secure the coating property suitable to the process of forming the ground electrode while securing a minimum stability required to the composition. However, if the solvent is excessively included in the composition, the concentration of the conductive polymer becomes relatively low and the electric resistance may increase and the shock resistance of the ground electrode formed by using the composition may deteriorate. Therefore, the content of the solvent is preferably 95 weight % or less per the total weight of the composition in order to prevent such deterioration.

Furthermore, the conductive composition according to the embodiment may include a silane coupling agent.

The silane coupling agent is a component for improving the dispersity of the conductive polymer, the dopant, and so on, and any silane coupling agent common in the technical field to which the present invention pertains may be used and it is not limited particularly.

However, according to the present invention, the silane coupling agent may be one or more compounds selected from the group consisting of an alkyloxysilane-based compound, an aminosilane-based compound, a vinylsilane-based compound, an epoxysilane-based compound, a methacryloxysilane-based compound, an isocyanatesilane-based compound, and a fluorinesilane-based compound.

Preferably, the silane coupling agent may be one or more compounds selected from the group consisting of tetraethyloxysilane, vinyltriethoxysilane, vinyltrimethoxysilane, vinyltris(β-methoxyethoxy)silane, γ-methacryloxy propyltrimethoxysilane, β-(3,4-epoxycyclohexyl)ethyltrimethoxysilane, glycidoxypropyltrimethoxysilane, γ-mercaptopropyltrimethoxysilane, γ-aminopropyltriethoxysilane, N-β-(aminoethyl)-γ-aminopropyltrimethoxysilane, γ-ureidepropyltriethoxysilane, phenyltriethoxysilane, methyltriethoxysilane, methyltrimethoxysilane, polyethyleneoxide-modified silane, polymethylethoxysiloxane, and hexamethyldisilazine.

And, the content of the silane coupling agent may be 0.1 to 20 weight %, preferably 1 to 15 weight %, and more preferably 3 to 10 weight %, per the total weight of the composition. Namely, the content of the silane coupling agent is preferably 0.1 weight % or more per the total weight of the composition in order to prevent the surface staining phenomenon and the decrease of the surface hardness due to the phase separation of the composition during the coating process. However, if the silane coupling agent is excessively included in the composition, the electric resistance may increase and the stability of the composition may be so much the worse. Therefore, the content of the silane coupling agent is preferably 20 weight % or less per the total weight of the composition in order to prevent such deterioration.

Furthermore, the conductive composition according to the present invention may further include additives common in the related art with necessity.

According to the present invention, said additive may be one or more selected from the group consisting of a binder resin, a surfactant, and a diluent solution of hydrochloric acid or acetic acid.

At this time, the content of the additives may be determined within the range that does not have a bad influence on the properties of the composition while showing a minimum effect of adding the same, and it may be 0.1 to 5 weight % per the total weight of the composition preferably.

On the other hand, according to another embodiment of the present invention, a method of forming a ground electrode for a LCD including a step of coating the conductive composition disclosed above on a substrate is provided.

Here, coating methods common in the related art may be unlimitedly applied to the method of coating the conductive composition on the substrate, and preferably, a spray method, a doctor blade method, a roll coating method, a dipping method, and the like may be used.

At this time, the coating thickness of the composition may be 0.1 to 1 µm. The ground electrode of a LCD may be prepared by soft-baking the coated composition under the temperature of 60 to 100° C. so as to form a film layer of 200 to 500 nm thickness, and drying the same under the temperature of about 100 to 150° C.

The conductive composition according to the present invention can be used for forming a ground electrode of a LCD as disclosed above, and it may be applied to the use of a coating film of a conductive polarizing plate which can replace existing ground electrodes in addition.

Hereinafter, preferable examples are provided for understanding the present invention. However, the following examples are only for illustrating the present invention, and the present invention is not determined to or by them.

EXAMPLE 1

A composition was prepared by mixing:
about 2 weight % of a resin (PEDOT-PSS, Manufacturer: Hube Global) in which poly(3,4-ethylene dioxythiophene) and poly(4-styrenesulfonate), a dopant, were mixed with the weight ratio of 1:7;
about 4 weight % of tetraethyloxysilane, a silane coupling agent;
about 92.9 weight of a solvent;
about 0.1 weight % of a surfactant (Product Name: TEGO-435, Manufacturer: TEGO); and
about 1 weight % of a diluent solution of hydrochloric acid (0.03 mol % hydrochloric acid aqueous solution).

At this time, the solvent was prepared by mixing 100 parts by weight of isopropylalcohol, about 125 parts by weight of propylene glycol monomethylether, about 17.9 parts by weight of dimethylformamide, and about 89.3 parts by weight of water.

The conductive composition was coated on an electrode formed on a substrate with the thickness of about 0.5 µm, and the ground electrode was formed by soft-baking the coated composition with a hot plate of about 80° C. for about 180 seconds so as to form a film layer of 300 nm thickness, and drying the same in an oven of about 120° C. for about 1 hour.

EXAMPLE 2

A composition was prepared by mixing:
about 2 weight % of a resin (PEDOT-PSS, Manufacturer: Hube Global) in which poly(3,4-ethylene dioxythiophene) and poly(4-styrenesulfonate), a dopant, were mixed with the weight ratio of 1:7;
about 4 weight % of tetraethyloxysilane, a silane coupling agent;
about 92.9 weight of a solvent;
about 0.1 weight % of a surfactant (Product Name: TEGO-435, Manufacturer: TEGO); and
about 1 weight % of a diluent solution of hydrochloric acid (0.03 mol % hydrochloric acid aqueous solution).

At this time, the solvent was prepared by mixing 100 parts by weight of isopropylalcohol, about 125 parts by weight of propylene glycol monomethyl ether, about 17.9 parts by weight of acetylacetone, and about 89.3 parts by weight of water.

The conductive composition was coated on an electrode formed on a substrate with the thickness of about 0.5 µm, and the ground electrode was formed by soft-baking the coated composition with a hot plate of about 80° C. for about 180 seconds so as to form a film layer of 300 nm thickness, and drying the same in an oven of about 120° C. for about 1 hour.

EXAMPLE 3

A composition was prepared by mixing:
about 2 weight % of a resin (PEDOT-PSS, Manufacturer: Hube Global) in which poly(3,4-ethylene dioxythiophene) and poly(4-styrenesulfonate), a dopant, were mixed with the weight ratio of 1:7;
about 4 weight % of tetraethyloxysilane, a silane coupling agent;
about 92.9 weight of a solvent;
about 0.1 weight % of a surfactant (Product Name: TEGO-435, Manufacturer: TEGO); and
about 1 weight % of a diluent solution of hydrochloric acid (0.03 mol % hydrochloric acid aqueous solution).

At this time, the solvent was prepared by mixing 100 parts by weight of isopropylalcohol, about 125 parts by weight of propylene glycol monomethyl ether, about 17.9 parts by weight of a 1:1 mixture (by weight) of dimethylformamide and acetylacetone, and about 89.3 parts by weight of water.

The conductive composition was coated on an electrode formed on a substrate with the thickness of about 0.5 µm, and the ground electrode was formed by soft-baking the coated composition with a hot plate of about 80° C. for about 180 seconds so as to form a film layer of 300 nm thickness, and drying the same in an oven of about 120° C. for about 1 hour.

COMPARATIVE EXAMPLE 1

A composition was prepared by mixing:
about 2 weight % of a resin (PEDOT-PSS, Manufacturer: Hube Global) in which poly(3,4-ethylene dioxythiophene) and poly(4-styrenesulfonate), a dopant, were mixed with the weight ratio of 1:7;
about 4 weight % of tetraethyloxysilane, a silane coupling agent;
about 92.9 weight of a solvent;
about 0.1 weight % of a surfactant (Product Name: TEGO-435, Manufacturer: TEGO); and
about 1 weight % of a diluent solution of hydrochloric acid (0.03 mol % hydrochloric acid aqueous solution).

At this time, the solvent was prepared by mixing 100 parts by weight of isopropylalcohol, 100 parts by weight of ethyleneglycol, and about 35 parts by weight of water.

The conductive composition was coated on an electrode formed on a substrate with the thickness of about 0.5 µm, and the ground electrode was formed by soft-baking the coated composition with a hot plate of about 80° C. for about 180 seconds so as to form a film layer of 300 nm thickness, and drying the same in an oven of about 120° C. for about 1 hour.

EXPERIMENTAL EXAMPLES

Concerning the ground electrodes formed by using the compositions of Examples 1-3 and Comparative Example 1, the uniformity of the coating surface, the surface resistance, the light transparency, the hardness, and the 500 hours reliability were measured or evaluated according to the following methods, and the results are listed in the following Table 1.

1) Uniformity of Coating Surface: the appearance of the coating surface was observed by using an electron microscope and evaluated as very good (⊚) in the case of showing the roughness less than about 2% of the coating thickness, good (○) in the case of showing the roughness of about 2 to 5% of the coating thickness, and poor (X) in the case of showing the roughness larger than 5% of the coating thickness.

2) Surface Resistance (MΩ/sq): the surface resistance per unit area was measured by using LORESTA (4-point probe) of Mitsubishi Chemical Co.

3) Light Transparency (%): the light transparency at 400 nm wavelength was measured by using a UV-visible spectrometer.

4) Hardness: the hardness was measured by using a pencil hardness tester with a basic load of 1 kgf.

5) 500 Hours Reliability: the surface resistance after leaving the specimen at room temperature (about 20° C.) for 500 hours, the surface resistance after leaving the specimen in an oven of high temperature (about 80° C.) for 500 hours, and the surface resistance after leaving the specimen under the condition of high temperature and high humidity (about 65° C., 90% RH) for 500 hours were measured in comparison with the initial surface resistance by using LORESTA (4-point probe) of Mitsubishi Chemical Co.

TABLE 1

| | | Example 1 | Example 2 | Example 3 | Comparative Example 1 |
|---|---|---|---|---|---|
| Coating Uniformity | | ⊚ | ⊚ | ⊚ | ⊚ |
| Surface Resistance (MΩ/sq) | | 50,000 | 50,000 | 50,000 | 10,000 |
| Light Transparency (%) | | 99 | 99 | 99 | 99 |
| Hardness (1 kgf) | | 8H | 8H | 9H | 7H |
| Reliability (MΩ/sq) | Initial | 100 | 100 | 100 | 100 |
| | Room Temperature 500 h | 200 | 200 | 160 | 500 |
| | High Temperature 500 h | 500 | 316 | 251 | 2000 |
| | High Temperature, High Humidity 500 h | 794 | 500 | 398 | 2000 |

As shown in Table 1, it is recognizable that the ground electrodes formed by using the compositions according to Examples 1-3 are superior in the coating uniformity and have low surface resistance and good light transparency and hardness. Particularly, it is also recognizable that the ground electrodes formed by using the compositions according to Examples 1-3 show the surface resistance less than 800 in the 500 hours reliability test and they have superior reliability.

Particularly, it is also recognizable that the ground electrode of Example 3 shows higher hardness and more stable reliability than other Examples and Comparative Example 1, because Example 3 uses the mixture of dimethylformamide and acetylacetone as the solvent.

Meanwhile, it is shown that the ground electrode formed by using the composition of Comparative Example 1 shows the coating uniformity and other properties equivalent to the ground electrodes according to Examples 1-3 but the result of the reliability test is inferior to those of Examples 1-3.

The invention claimed is:

1. A conductive composition for forming a ground electrode of a liquid crystal display (LCD), comprising:
   a conductive polymer at 0.1 to 10 weight %;
   a dopant at 0.1 to 10 weight %;
   a solvent at 60 to 95 weight %, said solvent having a carbonyl group in the molecule; and
   a silane coupling agent at 0.1 to 20 weight %.

2. The conductive composition according to claim 1, wherein the solvent is one or more solvents selected from the group consisting of dimethylformamide, acetylacetone, and a mixture thereof.

3. The conductive composition according to claim 1, wherein the solvent is a mixture of dimethylformamide and acetylacetone.

4. The conductive composition according to claim 1, further comprising one or more co-solvents selected from the group consisting of methyl alcohol, ethyl alcohol, isopropanol, ethylene glycol, butanediol, neopentyl glycol, 1,3-pentanediol, 1,4-cyclohexane dimethanol, diethylene glycol, polyethylene glycol, polybutylene glycol, dimethylol propane, trimethylol propane, propylene glycol monomethyl ether, chloroform, dichloromethane, tetrachloroethylene, trichloroethylene, dibromoethane, dibromopropane, n-methyl pyrrolidone, dimethyl sulfoxide, triethylamine, tributylamine, trioctylamine, cresol, and water.

5. The conductive composition according to claim 4, wherein the co-solvent is included with a weight ratio of 1:10 to 1:20 on the basis of the weight of the solvent having a carbonyl group in the molecule.

6. The conductive composition according to claim 1, wherein said solvent is selected from the group consisting of: 5 to 30 parts by weight of dimethylformamide, acetylacetone, and a mixture thereof; and said composition further comprising a co-solvent selected from the group consisting of: 100 parts by weight of isopropyl alcohol; 80 to 150 parts by weight of propylene glycol monomethyl ether; and 50 to 120 parts by weight of water; wherein said solvent and co-solvent are mixed.

7. The conductive composition according to claim 1, wherein the conductive polymer is one or more polymers selected from the group consisting of polyaniline-based polymer, polypyrrole-based polymer, and polythiophene-based polymer.

8. The conductive composition according to claim 1, wherein the conductive polymer is poly(3,4-ethylene dioxythiophene).

9. The conductive composition according to claim 1, wherein the dopant is one or more compounds selected from the group consisting of dodecylbenzenesulfonic acid, toluenesulfonic acid, camphorsulfonic acid, benzenesulfonic acid, hydrochloric acid, styrenesulfonic acid, 2-acrylamido-2-methylpropanesulfonic acid, 2-sulfosuccinate, 5-sodiumsulfoisophthalic acid, dimethyl-5-sodiumsulfoisophthalate, and 5-sodiumsulfo-bis(β-hydroxyethylisophthalate).

10. The conductive composition according to claim 1, wherein the, dopant is poly(4-styrenesulfonate).

11. The conductive composition according to claim 1, wherein the silane coupling agent is one or more compounds selected from the group consisting of an alkyloxysilane-based compound, an aminosilane-based compound, a vinylsilane-based compound, an epoxysilane-based compound, a methacryloxysilane-based compound, an isocyanatesilane-based compound, and a fluorinesilane-based compound.

12. The conductive composition according to claim 1, further comprising one or more additives selected from the group consisting of a binder resin, a surfactant, and a diluent solution of hydrochloric acid or acetic acid.

13. The conductive composition according to claim 12, wherein the content of the additive is 0.1 to 5 weight % per the total weight of the composition.

14. A method of forming a ground electrode for liquid crystal display, including a step of coating the conductive composition according to claim 1 on a substrate.

\* \* \* \* \*